United States Patent [19]

Chiu

[11] Patent Number: 5,494,222

[45] Date of Patent: Feb. 27, 1996

[54] FAUCET SPOUT

[76] Inventor: Hung-Li Chiu, No. 20, Lane 22, Sec. 1, Wu Chang Street, Taipei, Taiwan

[21] Appl. No.: 267,132

[22] Filed: Jun. 28, 1994

[51] Int. Cl.⁶ .............................. B05B 1/14; B05B 1/34; B01D 35/00
[52] U.S. Cl. .................. 239/462; 239/493; 239/497; 239/590.5; 210/449
[58] Field of Search ................... 239/462, 497, 239/575, 428.5, 590–590.5, 493, 492; 137/801; 210/449

[56] References Cited

U.S. PATENT DOCUMENTS

| | | | |
|---|---|---|---|
| 205,733 | 7/1878 | Dawson | 239/462 |
| 209,617 | 11/1878 | Hughes | 210/449 |
| 485,024 | 10/1892 | Aishton | 210/449 |
| 2,100,165 | 11/1937 | Holmberg et al. | 210/449 |
| 2,103,425 | 12/1937 | Lehman | 210/449 |
| 2,368,035 | 1/1945 | Moore | 210/449 |
| 2,664,278 | 12/1953 | Aghnides | 210/449 |
| 2,974,880 | 3/1961 | Stewart et al. | 239/493 |

FOREIGN PATENT DOCUMENTS 689271  3/1953  United Kingdom .................. 239/462

Primary Examiner—Karen B. Merritt
Attorney, Agent, or Firm—Browdy and Neimark

[57] ABSTRACT

A faucet spout including a sleeve member having a lower water exit, a core member having a closed end, a filtering screen, a resilient adapter fitted onto a faucet and a cap member. The core member is disposed in the sleeve member with the closed end facing the water exit of the sleeve member. The filtering screen is disposed in an inner insert groove of the sleeve member above the core member. The resilient adapter is disposed on an inner step section of the sleeve member. The cap member is screwed on an upper end of the sleeve member to associate the resilient adapter with the sleeve member. When the faucet is opened, the water flowing into the sleeve member is more than the water flowing out of the sleeve member so that the water accumulates therein and creates turbulence and back pressure, making the resilient adapter more firmly engage with the faucet without easily detaching therefrom. The water under pressure will be injected from the water exit of the sleeve member in fog pattern.

3 Claims, 6 Drawing Sheets

U.S. Patent  Feb. 27, 1996  Sheet 1 of 6  5,494,222
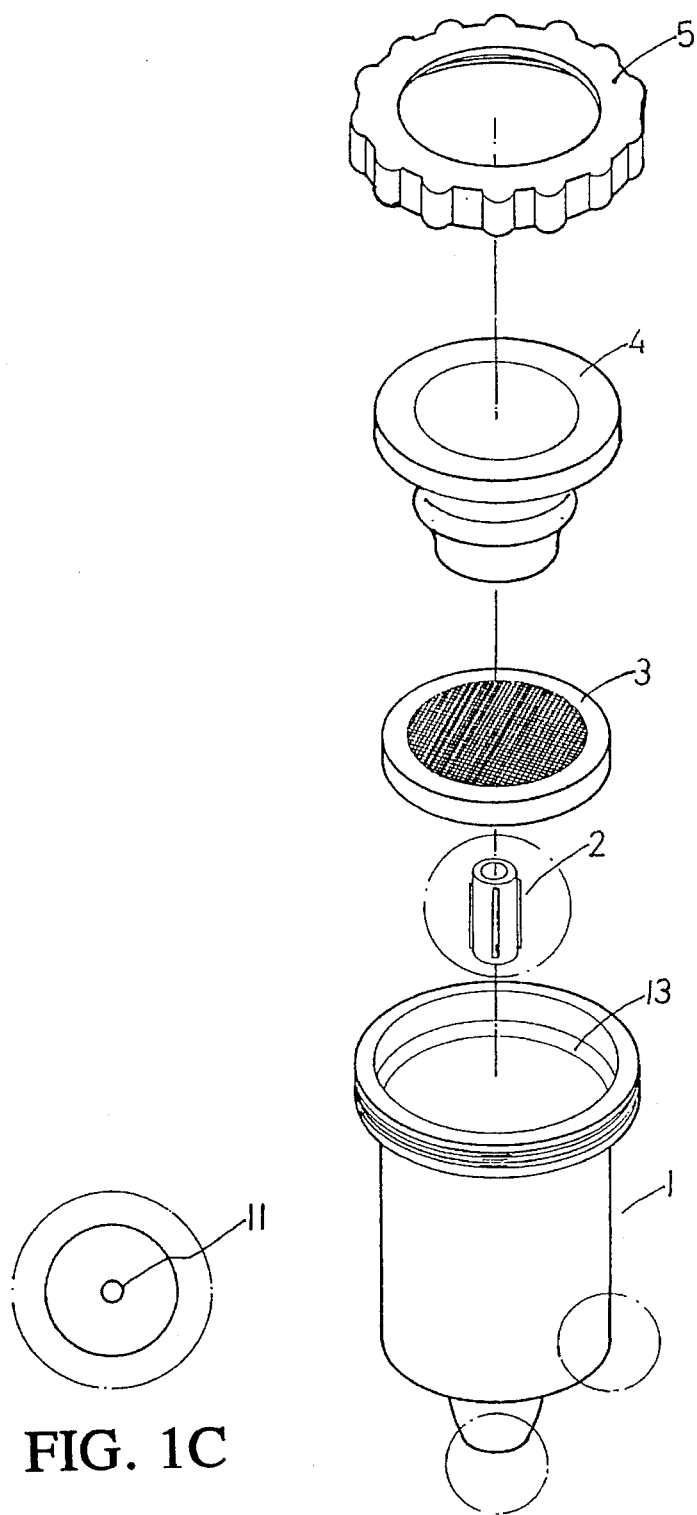
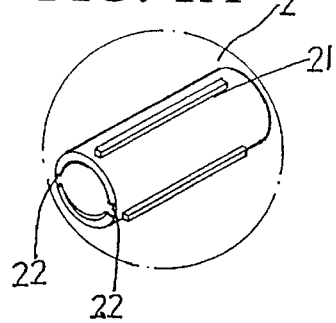
FIG. 1A
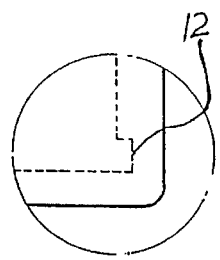
FIG. 1B
FIG. 1C
FIG. 1

5,494,222

FAUCET SPOUT

BACKGROUND OF THE INVENTION

The present invention relates to an improved faucet spout which is adapted to be securely fitted with the faucet.

It is known that when a user opens a faucet to wash his/her hands or an article, most of the water flowing out of the faucet is wasted. Therefore, a conventional faucet spout has been developed to be fitted onto the water outlet of the faucet so as to save water. However, such faucet spout is likely to detach from the faucet due to the flushing force of water.

SUMMARY OF THE INVENTION

It is therefore a primary object of the present invention to provide an improved faucet spout which can be tightly fitted with the faucet. Moreover, the faucet spout can store water to a certain extent and inject the water outward in a fog pattern so as to save water.

It is a further object of the present invention to provide the above faucet spout which is able to create water turbulence and back pressure so as to firmly engage with the faucet without easily detaching therefrom due to the flushing force of the water.

According to the above objects, the faucet spout of the present invention includes a sleeve member having a water exit, a filtering screen, a core member disposed between the wager exit of the sleeve member and the filtering screen, a resilient adapter fitted onto the water outlet of the faucet and a cap member. A front end of the core member is formed with two small clearances, whereby when the tap of the faucet is slightly switched open, the water will flow into the interior of the sleeve member and is stored therein without flowing out from the water exit of the sleeve member until the pressure of the water accumulated in the sleeve member reaches a certain value. At this time, the water is injected from the water exit under a considerably large pressure in a fog pattern, Accordingly, the injected atomized water is able to sufficiently clean up the user's hands or other articles and the amount of used water is reduced.

The present invention can be best understood through the following description and accompanying drawings, wherein:

BRIEF DESCRIPTION OF THE DRAWINGS

FIG. 1 is a perspective exploded view of the present invention;

FIG. 1A is an enlarged view of an element of FIG. 1;

FIG. 1B is an enlarged broken section view of an element of FIG. 1;

FIG. 1C is an enlarged plan view of an element of FIG. 1;

FIG. 6A is an enlarged view of an element of FIG. 6;

FIG. 6B is an enlarged plan view of an element of FIG. 6;

FIG. 6C is an enlarged broken section view of an element of FIG. 6;

DETAILED DESCRIPTION OF THE PREFERRED EMBODIMENTS

Figure 2:
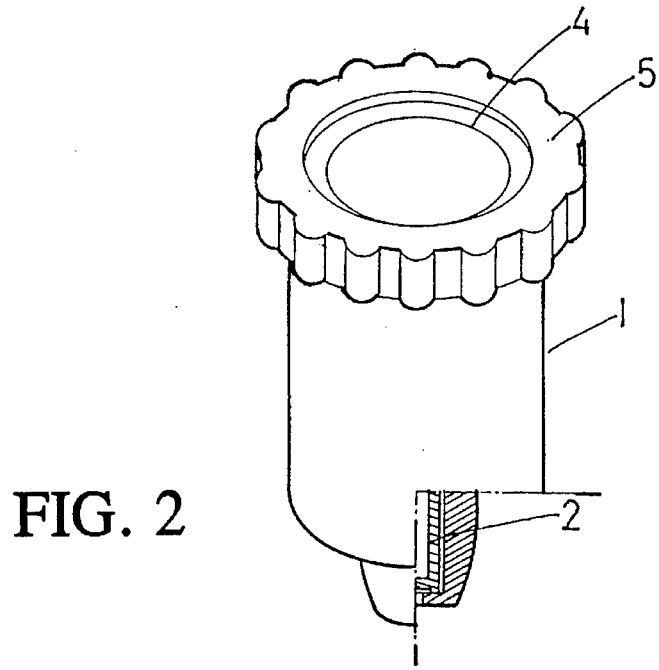
FIG. 2 is a perspective assembled view of the present invention.

Please refer to FIGS. 1 and 2. The faucet spout of the present invention includes a a sleeve member 1, a substantially cylindrical core member 2 disposed in the sleeve member 1, a circular filtering screen 3 disposed in the sleeve member 1 above the core member 2, a resilient adapter 4 fitted onto a water outlet of a faucet 9 and a cap member 5.

The sleeve member 1 includes an upper cylindrical hollow portion having an upper end formed with outer threads an inner step section 13, a lower end formed with an inner annular groove 12 to recieve screen 3 therein, a lower conic hollow portion having a central room for disposing the core member 2 therein and a lower water exit 11. The core member 2 is a cylindrical hollow member, having a closed end formed with two spiral clearances 22. Four lengthwise strips 21 are formed on the surface of the core member 2 to divide the same into four equal parts. The screen 3 is plate-like, having multiple filtering meshes located at a central portion of the screen 3. The adapter 4 is trumpet-like and disposed on the step section 13 of the sleeve member 1, and has a tapered opening for fitting onto the water outlet of the faucet. The cap member 5 is a circular member, having outer arch convex sections and inner thread adapted to be screwed onto the outer thread of the sleeve member 1.

Figure 3:
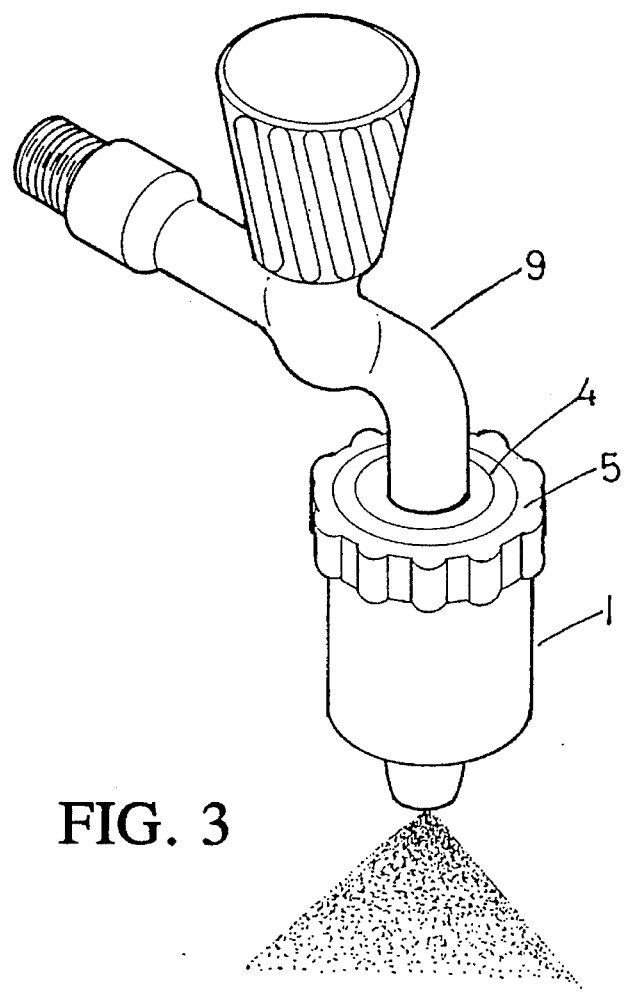
FIG. 3 shows that the faucet spout of the present invention is fitted with a faucet.
Figure 5:
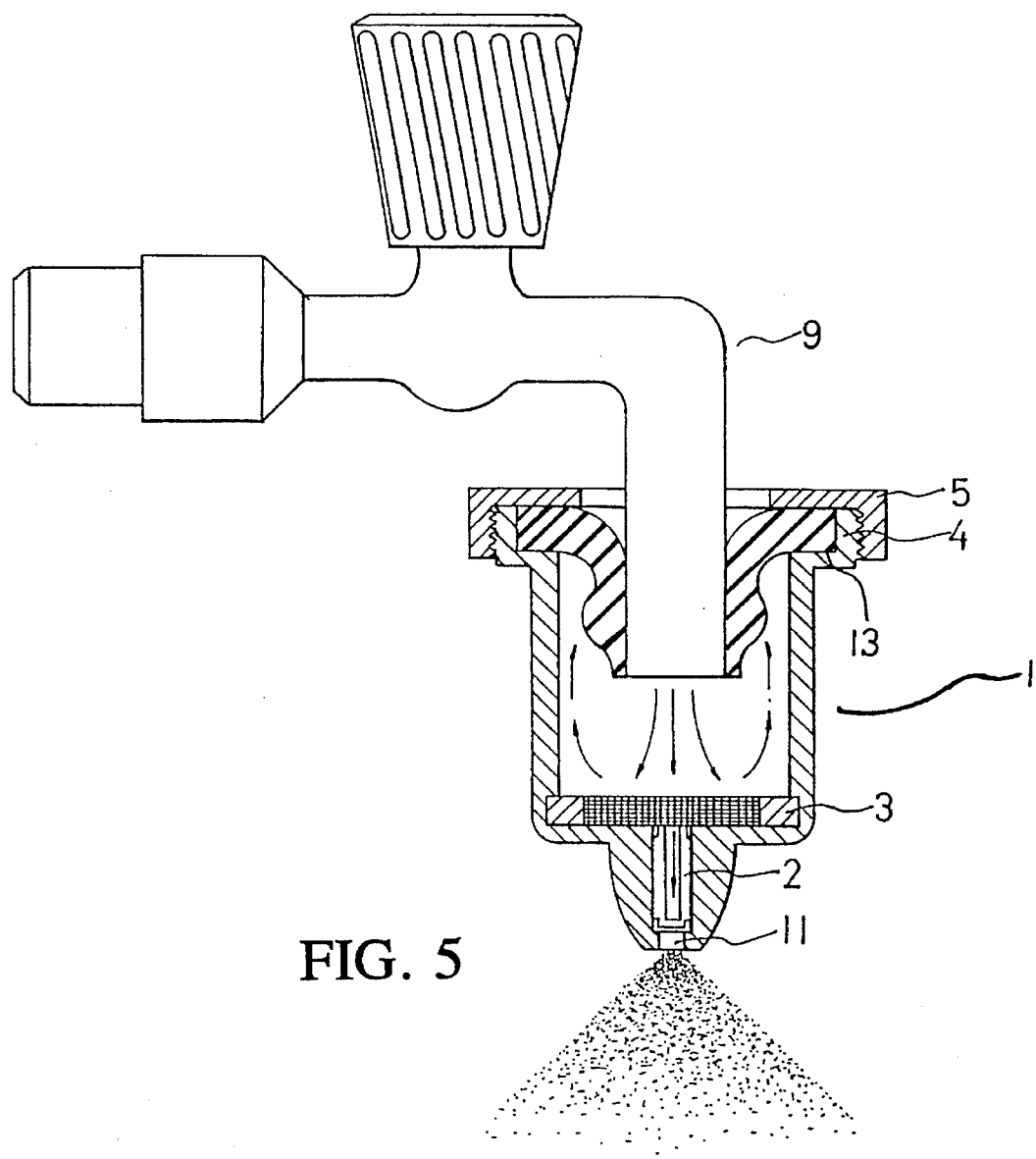
FIG. 5 is a sectional assembled view showing the water flow in the faucet spout.

Please refer to FIGS. 3 and 5. The faucet spout of the present invention is connected with the faucet by means of fitting the resilient adapter 4 onto the water outlet of the faucet 9. When the faucet 9 is opened, the water flowing into the sleeve member 1 is more than the water flowing out of the sleeve member 1 so that the water in the sleeve member 1 will rush toward the faucet 9, creating turbulence and back pressure. This makes the resilient adapter 4 more firmly engage with the faucet 9 without easily detaching therefrom.

Figure 4:
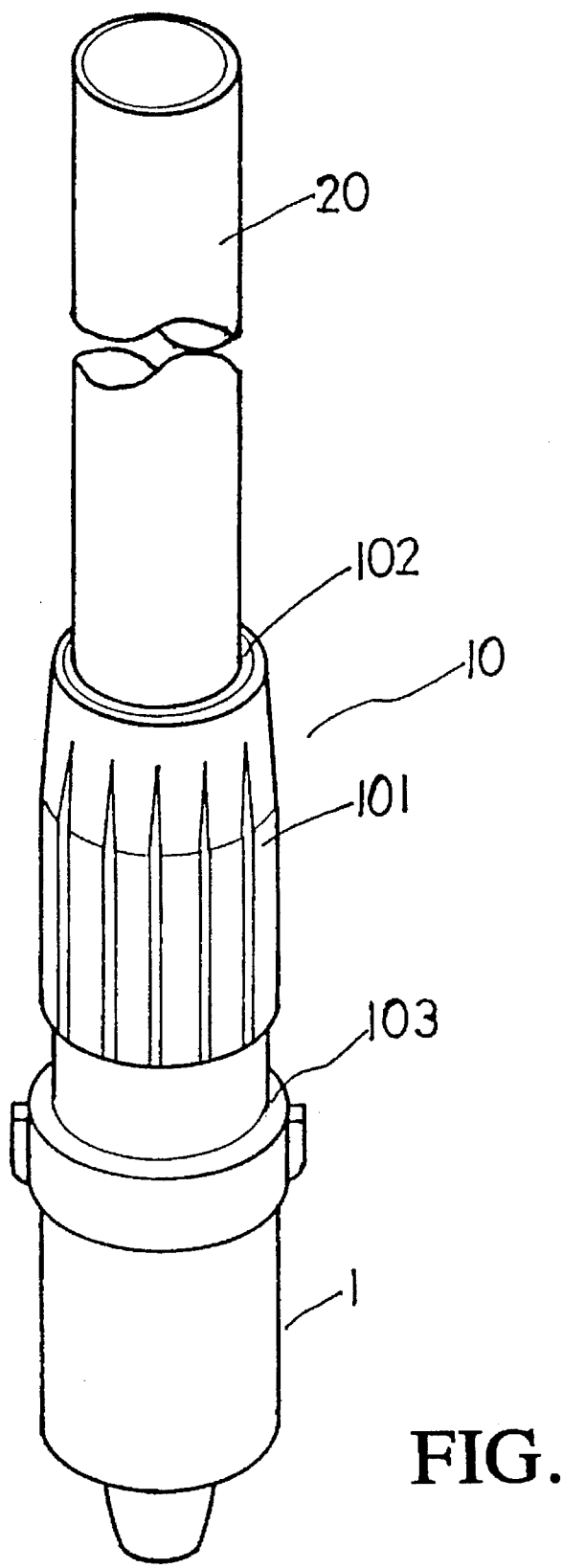
FIG. 4 shows that the faucet spout of the present invention is connected with a sprinkler connector for sprinkling purpose.

Please refer to FIG. 4. The faucet spout of the present invention can be alternatively connected with a sprinkler connector 10 composed of an upper sleeve 101, a washer 102 and a connecting seat 103. The connector 10 is further connected with a hose, whereby the faucet spout can serve as a sprinkler head for watering flowers or the like.

Figure 6:
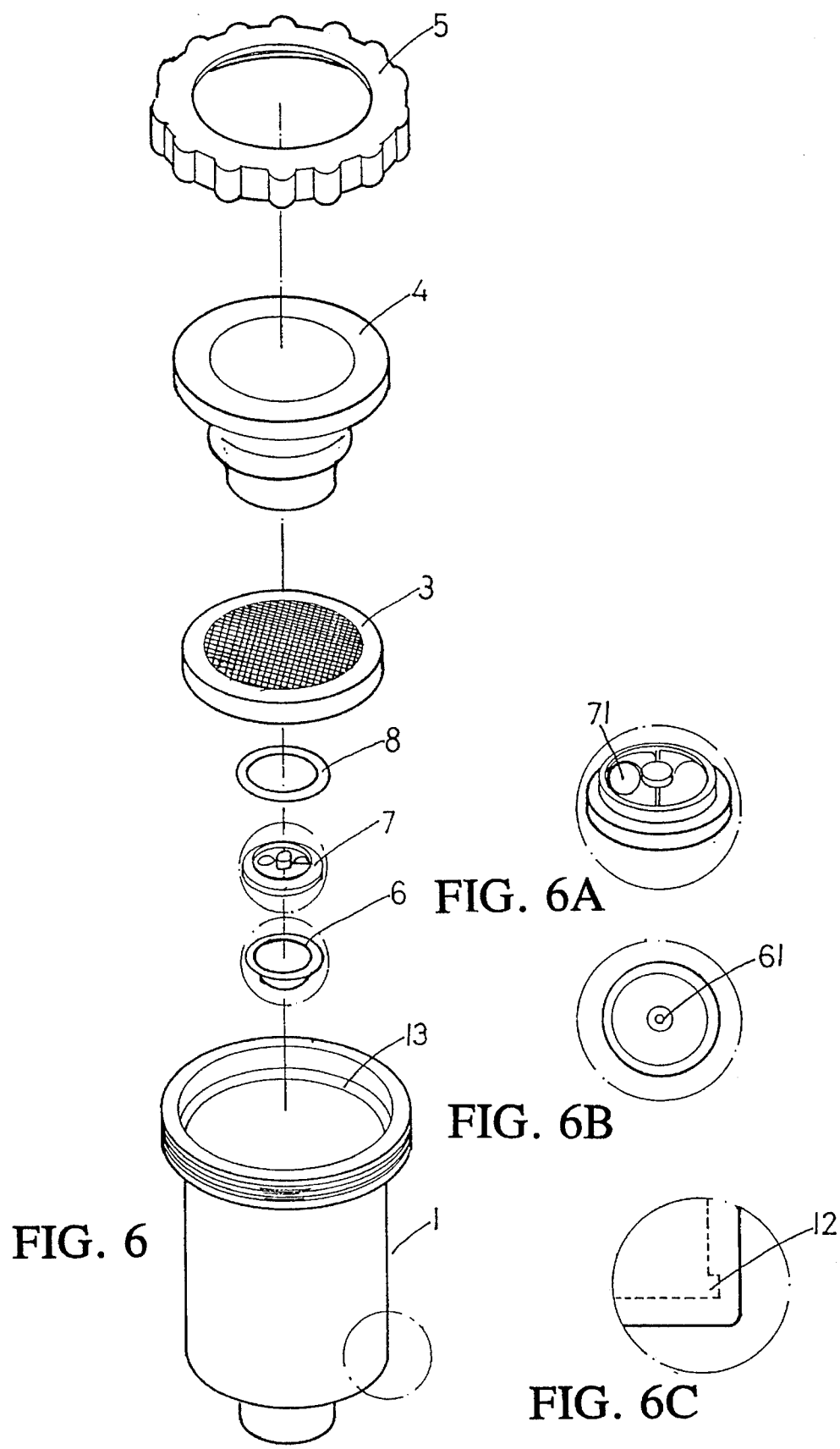
FIG. 6 is a perspective exploded view of another embodiment of the present invention.
Figure 7:
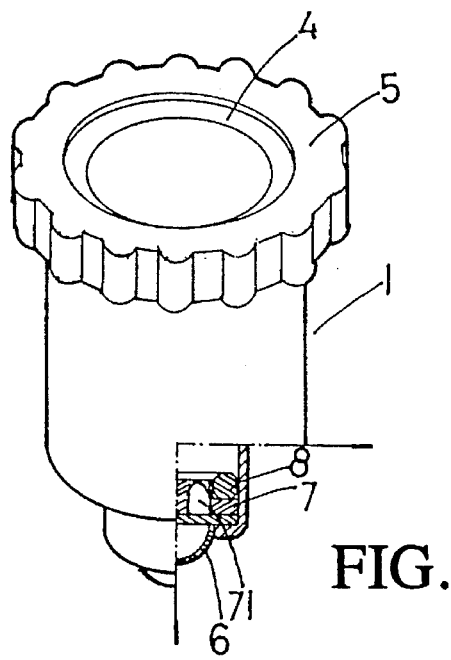
FIG. 7 is a perspective assembled view according to FIG. 6.
Figure 8:
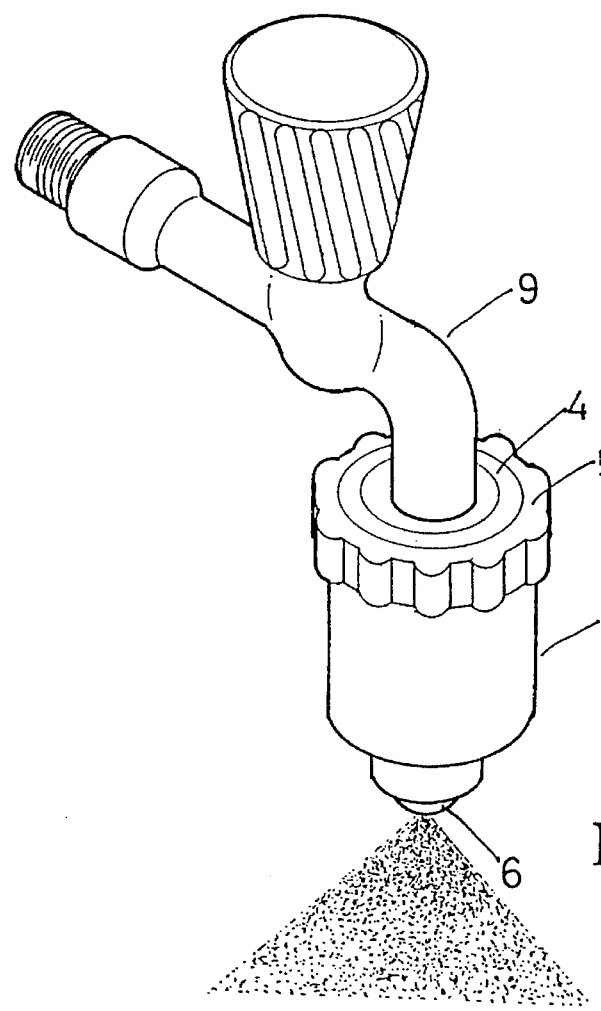
FIG. 8 shows that the faucet spout of FIG. 7 is fitted with a faucet.

Please refer to FIGS. 6 and 7 which show another embodiment of the present invention, wherein the core member 2 is substituted by a circular water-outgoing head 6 having a central water outlet 61, a circular water-interrupting plate 7 having two spiral lengthwise through holes 71 and an O-ring 8. Such arrangement can achieve the same function as the preceeding embodiment. FIG. 8 shows that the embodiment of FIG. 7 is fitted with the faucet 9 to discharge atomized water.

The above preferred embodiments are only examples of the present invention and the scope of the present invention should not be limited to these examples. Any modification or variation derived from the examples should fall within the scope of the present invention.

What is claimed is:

1. A faucet spout comprising a sleeve member, a substantially cylindrical core member disposed in said sleeve member, a circular filtering screen disposed in said sleeve member above said core member, a resilient adapter fitted with a faucet and a cap member, wherein:

said sleeve member includes an upper cylindrical hollow portion having an upper end formed with outer threads and an inner step section and a lower end formed with an inner annular groove receiving said screen therein, and a lower conic hollow portion having a central room for disposing said core member therein and a lower water exit;

said core member is a cylindrical hollow member, having a closed end formed with two spiral clearances and multiple lengthwise strips formed on a surface of said core member;

said filtering screen has multiple filtering meshes;

said adapter is disposed on said step section of said sleeve member, having a downward tapered open end for fitting onto the faucet; and said cap member is a circular member, having outer arch convex sections and inner threads adapted to be screwed onto said outer threads of said sleeve member.

2. A faucet spout as claimed in claim 1, wherein the water flowing into said sleeve member will rush back toward the faucet, creating turbulence and back pressure so as to make said resilient adapter more firmly engage with the faucet without easily detaching therefrom.

3. A faucet spout comprising a sleeve member, a circular water-outgoing head, a water-interrupting plate and an O-ring disposed in said sleeve member, wherein said circular water-outgoing head has a central water outlet and said interrupting plate has two central lengthwise through holes, a circular filtering screen disposed in said sleeve member above said O-ring, a resilient adapter fitted with a faucet and a cap member, wherein:

said sleeve member includes an upper cylindrical hollow portion having an upper end formed with outer threads and an inner step section and an a lower end formed with an inner annular groove receiving said screen therein, and a lower conic hollow portion having a central room first receiving said circular water-outgoing head, then said water interrupting plate and last said O-ring, said filtering screen has multiple filtering meshes;

said adapter is disposed on said step section of said sleeve member, having a downward tapered open end for fitting onto the faucet; and said cap member is a circular member, having outer arch convex sections and inner threads adapted to be screwed onto said outer threads of said sleeve member.

* * * * *